United States Patent

Heiberg

[11] Patent Number: 5,944,761
[45] Date of Patent: Aug. 31, 1999

[54] VARIABLE PERIODIC DISTURBANCE REJECTION FILTER

[75] Inventor: Christopher J. Heiberg, Peoria, Ariz.

[73] Assignee: Honeywell Inc., Minneapolis, Minn.

[21] Appl. No.: 08/870,743

[22] Filed: Jun. 6, 1997

[51] Int. Cl.[6] ............................. B64G 1/28; G06F 165/00
[52] U.S. Cl. .................................. 701/13; 701/4; 701/10; 701/226; 244/164; 244/169
[58] Field of Search .................................. 701/13, 14, 4, 701/10, 20, 226; 244/164, 165, 169, 171; 702/92, 94, 95

[56] References Cited

U.S. PATENT DOCUMENTS 5,459,669  10/1995  Adsit et al. ............................. 701/226
5,765,780   6/1998  Barskey et al. ........................ 244/165

Primary Examiner—Tan Nguyen
Attorney, Agent, or Firm—Charles J. Ungemach

[57] ABSTRACT

A filter for use in an attitude control system which may be subjected to vibrations from disturbances which have frequency contents that vary with time. Sensors on the system produce signals that contain the disturbance frequencies and a calculator connected to the source of disturbance produces a signal which varies as a function of the disturbance. The filter receives these signals and augments the control loop gain at the disturbance frequencies thereby enabling the attitude control devices to null the disturbance effects on the attitude of the system.

14 Claims, 3 Drawing Sheets

VARIABLE PERIODIC DISTURBANCE REJECTION FILTER

BACKGROUND OF INVENTION

1. Field of the Invention

The present invention is in the field of controls, specifically the rejection of unwanted mechanical disturbances and more particularly to the rejection of disturbances which change frequency with time.

2. Description of the Prior Art

Vibration nulling (or disturbance rejection) systems for use on spacecraft which are positioned so as to maintain a fixed pointing direction (for example a telescope) are known. In such a situation, the spacecraft needs to maintain the desired pointing direction even though forces from inside or outside the vehicle may cause disturbances. For example, when a space vehicle moves from a position in which it is in shadow, into a position in which it is in sunlight, the temperature difference can suddenly cause parts of the spacecraft to snap or sharply bend and, in so doing, produce vibrations that, if uncompensated, could cause the spacecraft to vibrate, thereby affecting the pointing direction for an undesirably long period of time before damping out. Heretofore, such unwanted vibrations have been calculable and their frequency constant so that a vibration filter can be introduced into the spacecraft torque actuation controls (e.g. torque actuators such as control moment gyros (CMGs), reaction wheels, torquing bars or thrusters etc.), which quickly nulls or cancels the unwanted frequency. Such a circuit is described in a paper entitled "Control Synthesis For Flexible Space Structures Excited by Persistent Disturbances," presented by Bong Wie and Marcelo Gonzalez in the Journal of Guidance, Control and Dynamics, Vol. 15, No. 1, 1992, pp 73–80.

Unfortunately, while some disturbances produce fixed frequency vibrations, other disturbances produce vibrations that change frequency with time. For example when a spacecraft is using a mechanical arm or grapple to move some object closer to or further away from the spacecraft, the inertia of the mechanical arm and the object changes as the effective length of the arm changes. Consequently, the frequency of any disturbance produced by the arm and object changes with time during the maneuver. Similarly, the motors which drive actuators, such as CMGs, may introduce cogging forces as the poles pass over the coils and the frequency of this kind of disturbance also varies with time since the speed of rotation of the actuators are not constant. Many other types of disturbances may cause variable frequency vibrations and the time to allow these vibrations to null themselves out may be unacceptably long. In such situations, the filters of the prior art are not sufficient to quickly null out the undesirable vibrations.

BRIEF DESCRIPTION OF THE INVENTION

The present invention solves the problem of the prior art devices and methods by introducing a filter in the feedback loop of the control circuit which significantly increases the gain of the control circuit at the frequency of the disturbance and tracks the disturbance when the frequency shifts. The increased gain produces additional authority to the torque actuators at the disturbance frequency. The revised torque from the actuators is applied to the spacecraft and is of such magnitude that the unwanted disturbance frequencies are rapidly nulled and the position control is not interrupted.

DETAILED DESCRIPTION OF THE PREFERRED EMBODIMENTS

Figures 1, 2:
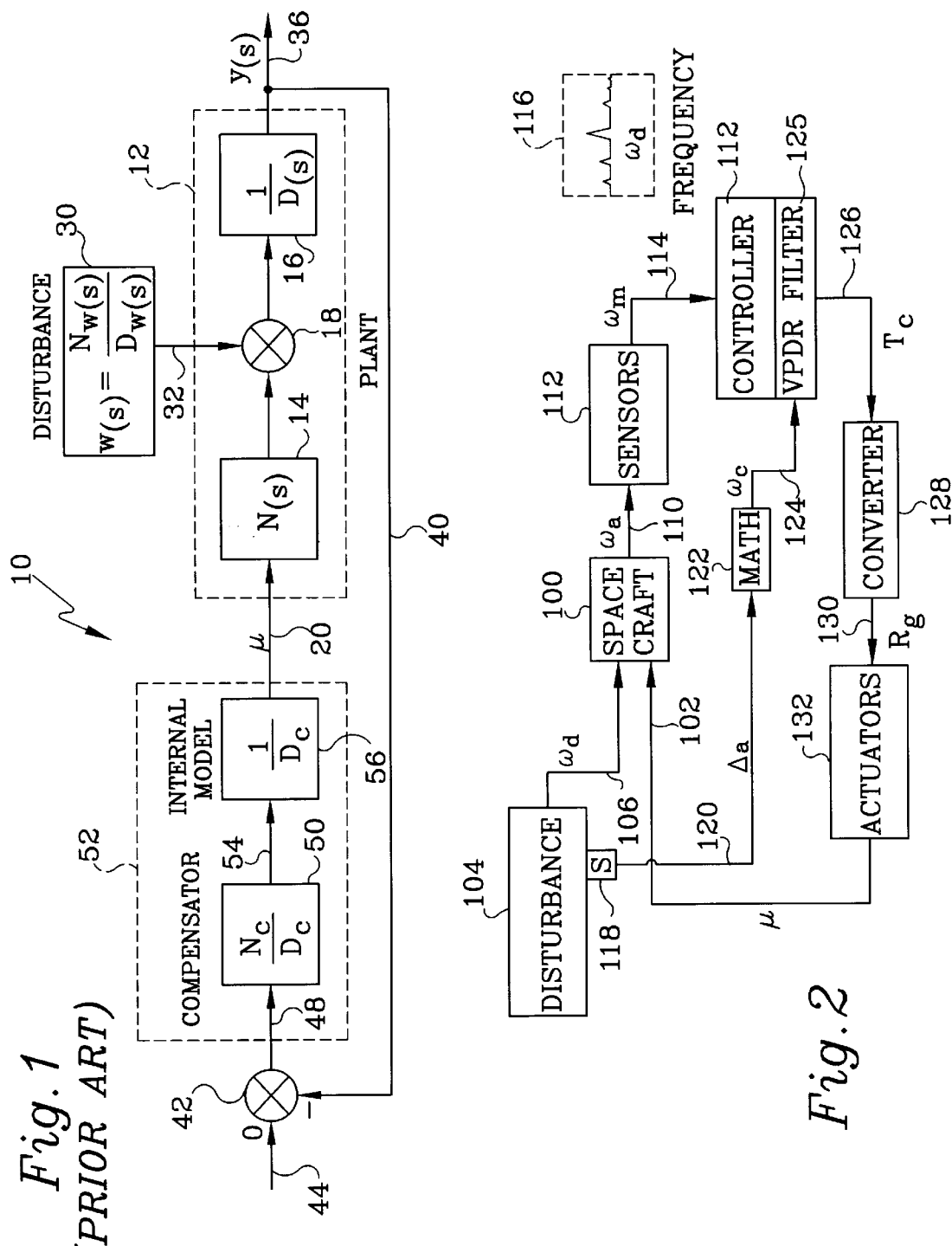
FIG. 1 is a block diagram of a fixed frequency disturbance rejection system of the prior art.
FIG. 2 is a block diagram of the present invention as used in a spacecraft model.

In FIG. 1, a block diagram of a fixed frequency rejection system 10, described in the above mentioned Wie and Gonzalez paper, is shown. The spacecraft is identified as a "plant" and is shown in dashed line box 12 containing a box 14 identified as N(s) which represents the numerator of the transfer function representing the spacecraft and a box 16 which represents the denominator of the transfer function representing the spacecraft. A summing junction 18 is shown between boxes 14 and 16.

Spacecraft 12 has a first input shown by arrow 20 which represents the torque, u, produced by the torque actuators such as CMGs of the spacecraft. So long as there is no disturbing forces acting on the spacecraft, the torque u on line 20 will hold the spacecraft in a desired direction, e.g. pointing at a star.

A box 30 identified with the equation $W(s)=N_w(s)/D_w(s)$ represents a disturbance such as a fixed torque frequency $W(s)$ determined from the transfer function of the disturbance, $N_w(s)/D_w(s)$, exerted on the spacecraft by, for example, the snapping of solar panels due to sudden temperature variations. $W(s)$, left uncompensated, could cause the spacecraft to vibrate and no longer point in the desired direction for undesirably long periods of time.

An input from the disturbance box 30 shown as arrow 32 presents the disturbance torque frequency, $W(s)$, to the summing junction 18 where it is added to the output from box 14 and supplied to the box 16 so that an output from the spacecraft, shown as y(s), appears on a connection shown as arrow 36 and represents the measured rate of rotation of the spacecraft as determined by rate sensing devices such as rate gyros. A connection shown as arrow 40 taps the measured rate and returns it to the left in FIG. 1 to a summing junction 42 where it is subtracted from an input rate command shown as arrow 44 representing the desired rate of rotation of the system 10. The output of junction point 42 is shown by an arrow 48 being presented to a compensator 50 in a controller shown by dashed line box 52. Compensator 50 is identified by $N_c/D_c$ representing the transfer function of the compensator. The output of compensator 50 is a command signal containing both the desired torque value and the disturbance torque value which is presented by a connection shown as arrow 54 to an internal model or filter 56 identified by the fraction $1/D_w$ which represents the denominator of the transfer function of the filter 56. Filter 56 operates to null the disturbance frequency and produce a new torque signal, u, that compensates for the disturbance so that the spacecraft 12 will continue to point in the desired direction.

As mentioned, the circuit of FIG. 1 operates to null disturbance frequencies which are known and constant. FIG. 1 will not null disturbance frequencies which vary with time as is the case, for example, with a grappling arm or with the cogging of the CMGs.

FIG. 2 shows a circuit similar to that of FIG. 1 but with expanded detail and which is modified so as to null disturbance frequencies which vary with time. In FIG. 2, the spacecraft 100 is shown receiving a control torque, u, from an input shown as arrow 102. Again, as long as there are no disturbances, the input torque, u, will cause the actuators to rotate the spacecraft at a desired rate so that it continues to point in a desired direction.

A disturbance box 104 is shown producing a torque disturbance which has the time varying rate or frequency $\psi_d$ on an output shown as arrow 106 presented to spacecraft 100. The actuation torque, u, and disturbance torque with frequency, $\psi_d$, are applied to the spacecraft 100, inducing a rotation rate, $\psi_a$, shown by arrow 110 indicative of the actual rate of rotation of the spacecraft 100. Sensors such as rate gyros shown in box 112 detect the actual rate $\psi_a$ and produce an output signal $\psi_m$ indicative of the three axis measured rate of rotation of the spacecraft 100 which is presented to a spacecraft controller 112 by way of a connection shown as arrow 114. An instantaneous look at the frequencies contained in the measured rate signal $\psi_m$ is seen in a dashed line box 116 to contain the frequency content of the angular rate. The peak, $\psi_d$, is the frequency of the disturbance.

Assuming that the disturbance of varying frequency is being produced by a grapple arm of changing effective length which can be determined from the angle $\alpha$ of the arm joint, a sensing device shown in box 118 associated with the arm produces a signal indicative of $\alpha$ and provides a signal $\Delta\alpha$ representing changes in the arm angle and thus changes in the length of the arm, by way of a connection 120 to a math box 122. Math box 122 is programmed to convert the changes $\Delta\alpha$ into signals indicative of the three axis calculated disturbance rate $\psi_c$, which is presented on a connection shown as arrow 124 to a Variable Periodic Disturbance Rejection (VPDR) filter 125 to be describe in connection with FIG. 3. It will be understood, that the arm angle sensor 118 may be any device which has knowledge of the length of the grapple arm and need not necessarily be attached to the disturbance box 104. For example, if the arm moved in a known predictable way with time, then a clock could be used to determine the length or if a pneumatic arm was used, the pressure used to extend the arm could be sensed.

Controller 112 and VPDR filter 125 produce an output, $T_c$, indicative of the three axis desired torque and presents it via a connection shown as arrow 126 to a converter 128 which changes the command signals to appropriate three axis actuation commands, $R_g$ on a line shown as arrow 130 which is used to operate torque actuators 132 such as CMGs or reaction wheels etc. to produce the torque, u, which controls the three axis rotation of the spacecraft 100.

Figure 3:
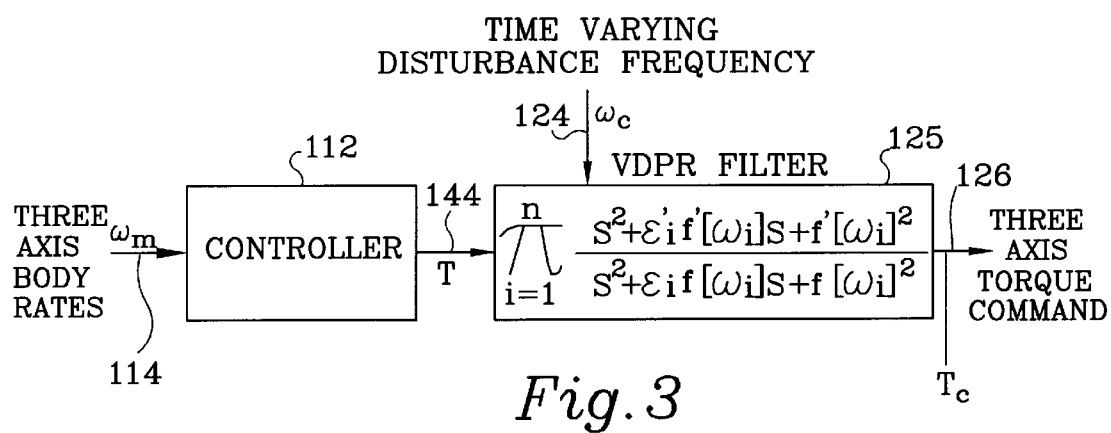
FIG. 3 is a block diagram of a variable periodic disturbance rejection filter according to the present invention.

The gain of the feedback loop including converter 128 and drive means 132 is controlled by the Variable Periodic Disturbance Rejection (VPDR) filter 125 which is also shown in FIG. 3. In FIG. 3, the calculated time varying disturbance frequency, $\psi_c$, is presented to the VPDR filter 125 by the connection 124, as in FIG. 2. The three axis measured rate signal, $\psi_m$, is shown by an arrow 114 being presented to the spacecraft controller 112 as in FIG. 2. Controller 112 produces a three axis control signal, T, on a connection shown as arrow 144 to the VPDR filter 125. The VPDR filter 125 operates in accordance with the transfer function:

$$\prod_{i=1}^{n} \frac{S^2 + \xi'_i f'[\omega_i]S + f'[\omega_i]^2}{S^2 + \xi_i f[\omega_i]S + f[\omega_i]^2}$$

Where $$\prod_{i=1}^{n}$$

represents the multiplication function from i=1 to n;

n represents the number of disturbance frequencies being rejected;

S represents the Laplace operator in the frequency domain representation of the transfer function;

$\xi'_i$ represents the damping factor for the balancing zero (can be large or small depending on the design and performance goals);

$\xi$ represents the damping factor for the disturbance rejection pole (should be small or zero depending on the design and performance goals);

f'($\psi_i$) represents a function operator on the disturbance frequency to locate the balancing zero (can be as simple as a scalar multiplier);

f($\psi_i$) represents a function operator on the disturbance frequency to locate the disturbance rejection pole (should be at or very near unity); and, $\psi_i$ represents an individual disturbance frequency in a particular axis to produce the torque control signal, $T_c$, on the line shown by arrow 126 of FIG. 2.

In FIG. 2, the variable periodic disturbance rejection filter 140 is shown as part of spacecraft controller 112, but it should be understood that the VPDR filter may be associated with converter 128 as part of the actuator loop or elsewhere in the system control loop. In any event, when the measured spacecraft rates contain disturbances, the VPDR filter provides additional gain at the disturbance frequencies, for example, by a factor of one hundred. This increased gain in the feedback loop at the disturbance frequency provides additional authority to the actuators and the torque, u, on line 102 operates to quickly damp out the disturbance rate $\psi_d$ on line 106 so that it has substantially no effect on the spacecraft 100. Thus the pointing angle of the spacecraft 100 will remain unchanged during the time that the disturbance is occurring.

If the disturbance was cause by the cogging of the CMGs, then the system would operate the same as described above for the grapple arm example except that the sensor 118 would be sensitive to CMG rate and the math box 122 would determine the cogging frequency. If more than one disturbance occurs, additional VPDR filters such as 125 may be included in the feedback loop and this would then operate to increase the gain at the second, third etc. disturbance to null out the additional disturbance frequencies.

Figure 4:
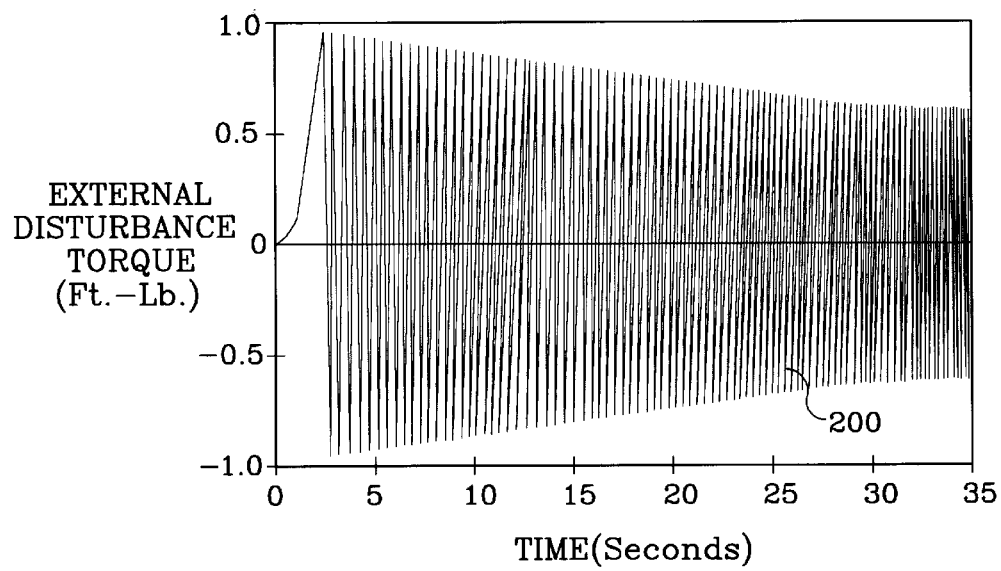
FIG. 4 is a graph showing a variable frequency disturbance which is applied to a model of a spacecraft.

FIG. 4 shows a sine curve 200 of the disturbance torque which has a variable frequency content which is applied to the spacecraft in one axis. The other two axes may have similar curves. The curve 200 slowly decreases in magnitude with the change in grapple arm length and may, as shown at the right side of the curve 200 be relatively constant in magnitude if the arm stops changing length. Over a long period of time, the frequency will damp it self out.

Figure 5:
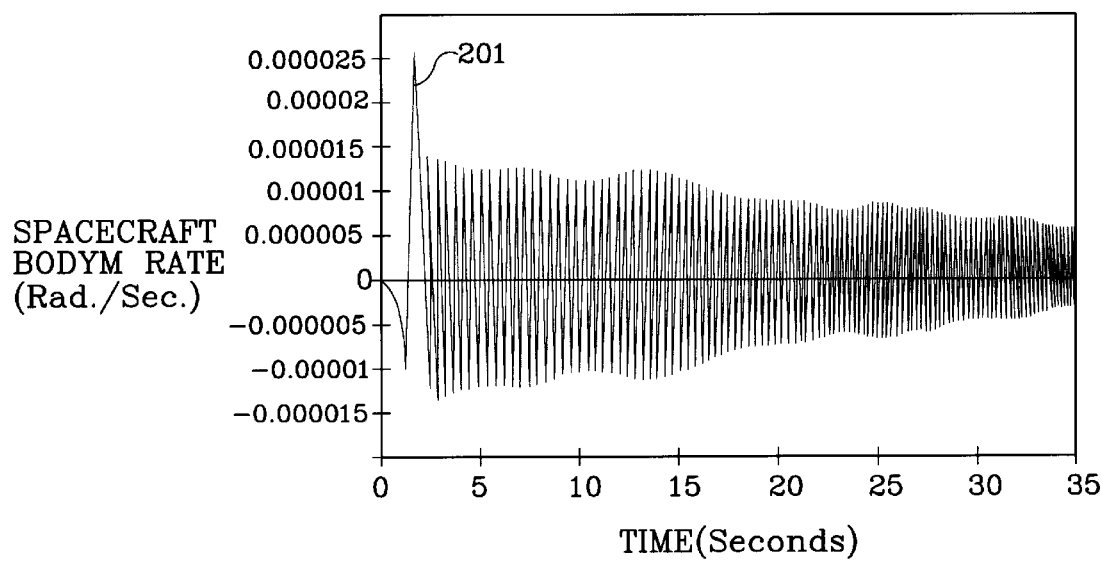
FIG. 5 is a graph showing the spacecraft body rates under the influence of the disturbance torque when a conventional controller is used; and, FIG. 6 is a graph showing the rapid nulling of the disturbance using the present invention.

FIG. 5 shows a curve 201 of the spacecraft body rates under the influence of the one axis disturbance torque of FIG. 4, where the spacecraft utilizes a conventional controller scheme without the use of the present invention. Again, the magnitude slowly decreases as the frequency increases and may reach a relative constant value, as shown at the right, if the arm stops changing length. Eventually the disturbance will damp itself out but it is seen that over a considerable period of time, the disturbance is not damped with the result that the spacecraft cannot be used for its intended purpose.

Figure 6:
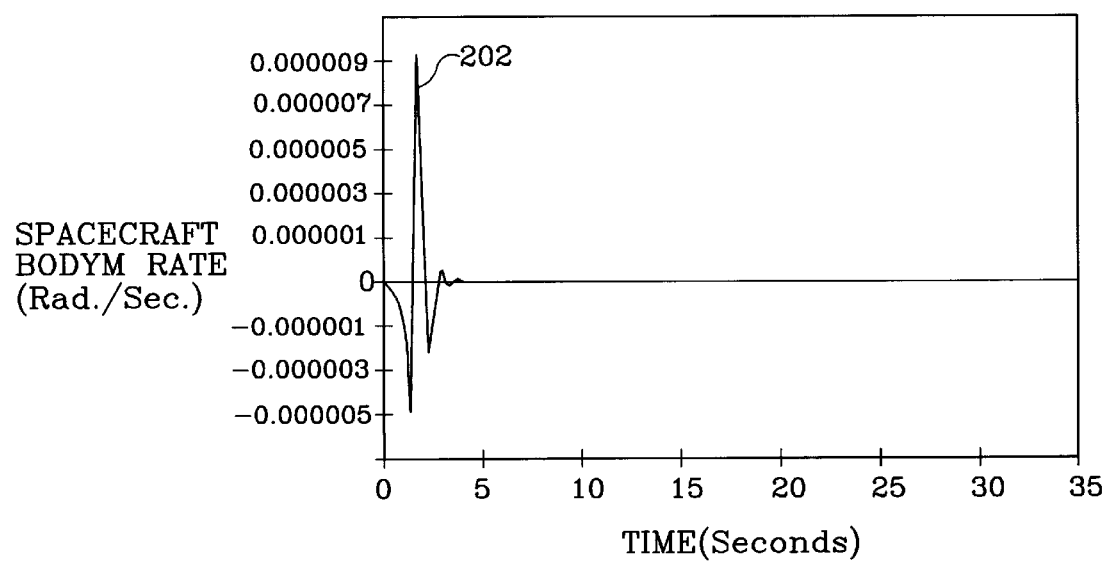

FIG. 6 shows the improvement with the use of the present invention. In FIG. 6, the body rate produced by the one axis disturbance frequency is shown by curve 202 which is seen to damp out in about 3 seconds.

It is thus seen that I have provided a novel filter arrangement which will damp out unwanted disturbance frequencies even though the frequencies change with time. It is noted that the present invention also works with fixed frequency disturbances and can be adjusted to meet changing conditions. Many modifications will occur to those having skill For he art. For example, while spacecraft have been used as the environment for the present invention, aircraft, marine, submarine and ground based equipment which have unwanted disturbance frequencies introduced into the operation may also use the present invention to advantage. Accordingly, I do not wish to be limited to the specific showings used herein to describe the preferred embodiment.

The embodiments of the invention in which an exclusive property or right is claimed are defined as follows:

1. Apparatus for use with a system having control devices for moving the system in accordance with a control signal, and in which a source of mechanical disturbances produces vibrations that may vary in frequency comprising:
   first means connected to the system for detecting the vibrations and producing a first signal indicative of a measured value of the disturbance frequency;
   means responsive to the source of the disturbances for producing a second signal indicative of a calculated value of the disturbance;
   variable periodic disturbance rejection filter means connected to receive the first and second signals and operable in accordance with the transfer function, $$\prod_{i=1}^{n} \frac{S^2 + \xi_i' f'[\omega_i]S + f'[\omega_i]^2}{S^2 + \xi_i f[\omega_i]S + f[\omega_i]^2}$$

to alter the control signal so as to reduce the effect of the disturbance.

2. Apparatus according to claim 1 wherein the system is a spacecraft having a controller, the control signal is a torque command from the controller and the first means comprises an inertial reference device.

3. Apparatus according to claim 2 wherein the source of disturbance comprises a mechanical grapple arm, the effective length of which may change.

4. Apparatus according to claim 2 wherein the source of disturbance comprises a CMG having rotational speeds which may change.

5. Apparatus according to claim 2 wherein the controller receives the first and second signals and produces a desired attitude signal which is presented to the filter and the filter produces the desired torque command signal.

6. Apparatus according to claim 5 further including a converter to receive the desired torque command signal and to convert it to a drive signal for driving the control devices.

7. Apparatus according to claim 6 wherein the control devices are torque actuators.

8. In a spacecraft control system having control devices with an input to receive a control signal and operable in accordance therewith to orient the spacecraft, the system further having sensors for producing an output indicative of the spacecraft orientation, the system further having a controller to receive the output of the sensors and produce a control output signal for use in providing the control signal to the control devices and the system further having a source of disturbance which produces disturbance frequencies that vary with time and which are sensed by the sensors to effect the control signal, comprising:
   a variable periodic disturbance rejection filter having a first input to receive the control output signal with the disturbance frequencies therein, having a second input connected to the source of disturbance to receive a signal indicative of calculated value of the disturbance frequency and operable to provide a gain at the disturbance frequency when the disturbance frequency is encountered in the control output signal, the gain being operable to alter the control signal so as to null the disturbance frequency.

9. Apparatus according to claim 8 wherein the source of disturbance comprises a mechanical grapple arm and the signal to the second input of the filter is a function of the effective length of the arm.

10. Apparatus according to claim 8 wherein the source of disturbance comprises a CMG and the signal to the second input of the filter is a function of the rate of the CMG.

11. Apparatus according to claim 8 further including a converter to receive the filter output signal and to convert it to the drive signal for driving the spacecraft control devices.

12. Apparatus according to claim 11 wherein the control devices are torque actuators.

13. Apparatus according to claim 8 wherein the variable periodic disturbance rejection filter operates in accordance with the transfer function $$\prod_{i=1}^{n} \frac{S^2 + \xi_i' f'[\omega_i]S + f'[\omega_i]^2}{S^2 + \xi_i f[\omega_i]S + f[\omega_i]^2}.$$

14. The method of rejecting unwanted vibrations produced in an object by a disturbance source comprising the steps of:
   A. sensing the motions of the object including any unwanted vibrations therein and producing a first signal containing the frequencies of the sensed motions;
   B. calculating the frequencies of the unwanted vibrations and producing a second signal indicative thereof;
   C. combining the first and second signals in a variable periodic disturbance rejection filter to produce an output signal which has enhanced gain portions when the frequencies of the unwanted vibrations are encountered in the first signal; and
   D. controlling the motion of the object in accordance with the output signal, the enhanced gain portions of the output signal operating to null the vibrations produced by the disturbance source.

* * * * *